United States Patent
Johnson (10) Patent No.: US 11,446,819 B2
(45) Date of Patent: Sep. 20, 2022

(54) END-OF-ARM TOOL FOR ROBOTIC ARM

(71) Applicant: Pearson Packaging Systems, Spokane, WA (US)

(72) Inventor: Michael J. Johnson, Spokane, WA (US)

(73) Assignee: Pearson Packaging Systems, Spokane, WA (US)

( * ) Notice: Subject to any disclaimer, the term of this patent is extended or adjusted under 35 U.S.C. 154(b) by 897 days.

(21) Appl. No.: 16/265,838

(22) Filed: Feb. 1, 2019

(65) Prior Publication Data

US 2019/0255704 A1 Aug. 22, 2019

Related U.S. Application Data

(60) Provisional application No. 62/632,961, filed on Feb. 20, 2018.

(51) Int. Cl.
| | |
|---|---|
| *B25J 19/00* | (2006.01) |
| *B65G 47/91* | (2006.01) |
| *B25J 9/16* | (2006.01) |
| *B25J 15/06* | (2006.01) |
| *B25J 9/00* | (2006.01) |

(52) U.S. Cl.
CPC .......... *B25J 9/1664* (2013.01); *B25J 9/0009* (2013.01); *B25J 15/0616* (2013.01); *B65G 47/917* (2013.01); *B65G 47/914* (2013.01)

(58) Field of Classification Search
CPC ................... B25J 9/16; B25J 9/00; B25J 5/06
See application file for complete search history.

(56) References Cited

U.S. PATENT DOCUMENTS

| | | | | |
|---|---|---|---|---|
| 5,778,640 | A * | 7/1998 | Prakken | B65B 5/061 53/244 |
| 7,017,961 | B1 * | 3/2006 | Parnell | B25J 15/0616 294/188 |
| 11,059,185 | B2 * | 7/2021 | Baylor | B25J 9/0093 |
| 2007/0119125 | A1 * | 5/2007 | Stenbom | B65B 5/105 53/473 |
| 2008/0093371 | A1 * | 4/2008 | Ubidia | G07F 11/62 221/1 |
| 2011/0293397 | A1 * | 12/2011 | Lomerson, Jr. | B65B 5/06 414/800 |

* cited by examiner

*Primary Examiner* — Kira Nguyen
(74) *Attorney, Agent, or Firm* — Lee & Hayes, P.C.

(57) ABSTRACT

An end-of-arm tool and an associated robotic arm are configured to place items (e.g., soft-sided merchandise) into a case. In an example, an end-of-arm tool is configured to grasp a surface (e.g., the top surface) of an item of merchandise and deposit the item into the case. Accordingly, as an item is deposited, the tool uses contact with that item to move previously placed items back into their preferred locations. After the penultimate item in a row of items is put in place, it may move out of position. As a final item is added to a row, the tool pivots the final item so that a side surface of the final item pushes the penultimate item into its correct position. The tool then pivots the final item to orient the top surface of the item horizontally, and places it in a predetermined position.

18 Claims, 13 Drawing Sheets

END-OF-ARM TOOL FOR ROBOTIC ARM

RELATED APPLICATIONS

This patent application claims priority to U.S. provisional patent application Ser. No. 62/632,961, titled "End-of-Arm Tool for Robotic Arm", filed on 20 Feb. 2018, commonly assigned herewith, and hereby incorporated by reference.

BACKGROUND

Robotic arms are frequently used to load cases (e.g., cardboard boxes) with merchandise. An end-of-arm tool of a robotic arm may grasp one or more items of merchandise and place them in the case. In the case of soft-sided items of merchandise, some shifting of the items may occur upon release by the tool, particularly if the items are slick and/or if the items have uneven top or bottom surfaces and are placed on top of other items. The shifting may make it difficult to properly position subsequent items. It may be difficult to position the last item in a row of items in the case, particularly if the penultimate (next-to-last) item in the row of items is out-of-position. Ultimately, less than an optimal number of items will be placed in the case, or the case size may be increased to allow for the desired number of items to be included.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes the structure and operation of a system including an end-of-arm tool and an associated robotic arm. The system is configured to place items (e.g., soft-sided items of merchandise) into a case (e.g., a cardboard box). In an example, an end-of-arm tool is configured to grasp a surface (e.g., the top surface) of an item of merchandise. The tool deposits the item into a case. Additional items may be deposited, to form a row of items in the case. After an item is placed into a position, it may slip slightly from its designated position. This is particularly true when a slippery soft-sided item is placed on top of another slippery soft-sided item. Accordingly, as an item is deposited, the tool uses contact with that item to move previously placed items back into their preferred locations. After the penultimate (next to last) item in a row of items is put in place, it may slip and move slightly out of position. Accordingly, the final item to be placed in the row of items is used to push the penultimate item (and perhaps other items) into their proper positions. In an example, the tool pivots to orient the final item with its top surface at an angle to the horizon. A side surface of the final item is placed against the penultimate item, and the penultimate item is moved into its correct and predetermined position. In some instances, movement of the penultimate item may also move other items into their correct and predetermined positions. The tool then pivots the final item to orient the top surface of the item horizontally (i.e., to restore the final item to a right-side-up configuration), and places the final item in its correct and predetermined position.

Discussion of Prior Systems and Techniques

Figure 1:
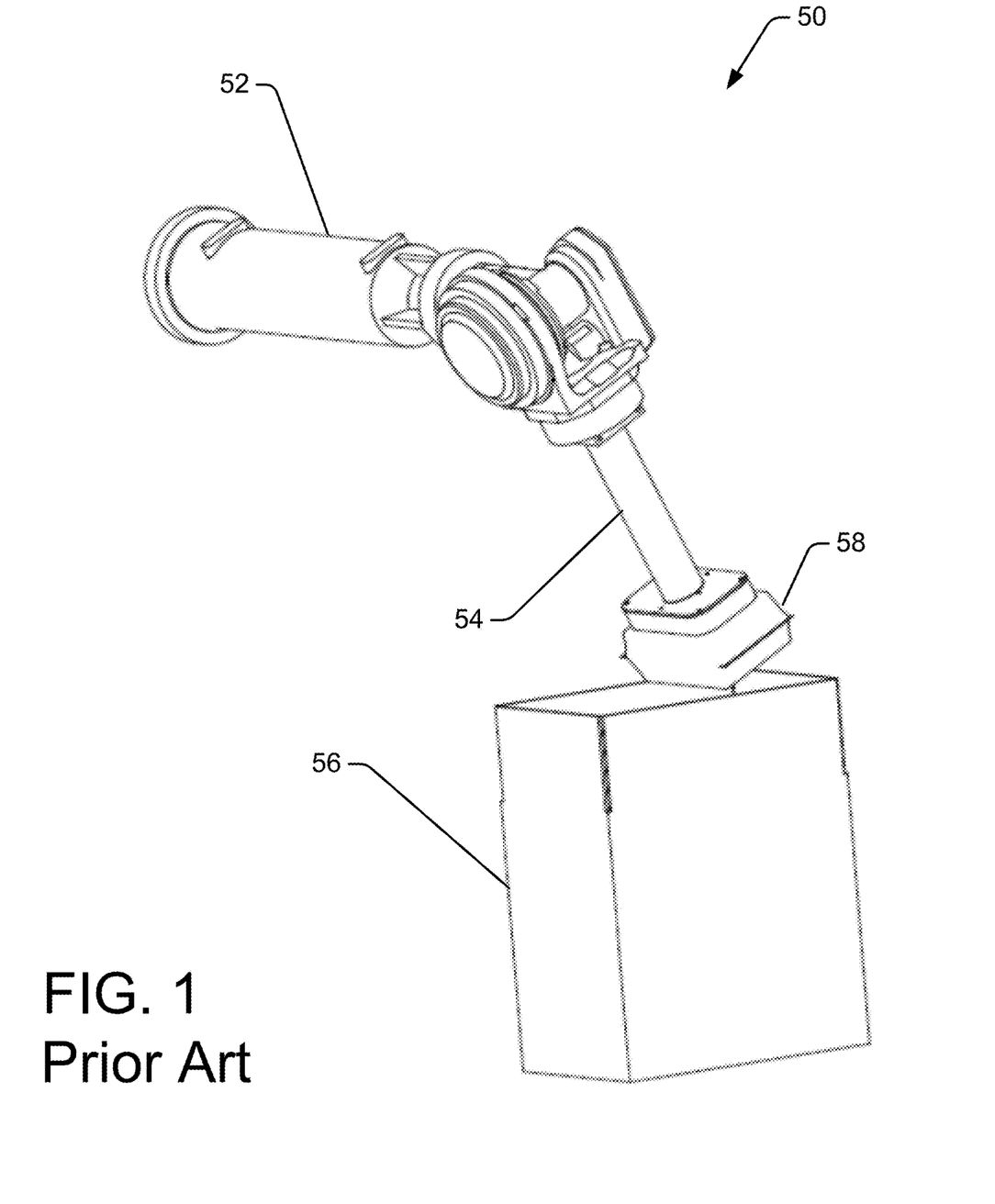
FIG. 1 is a perspective view of a prior art system including a robotic arm and a fixed end-of-arm tool, wherein the tool carries an item of merchandise.

FIG. 1 shows a prior art system 50, including a robotic arm 52 and a fixed (i.e., non-pivoting) end-of-arm tool 54. The system 50 is configured to load items into a case 56. In this example, the tool 54 is shown carrying a final item 58 of merchandise to be placed into a row of items (not shown) of merchandise already placed in the case 56. The tool 54 is not configured structurally to pivot or rotate the item with respect to the tool.

Figure 2:
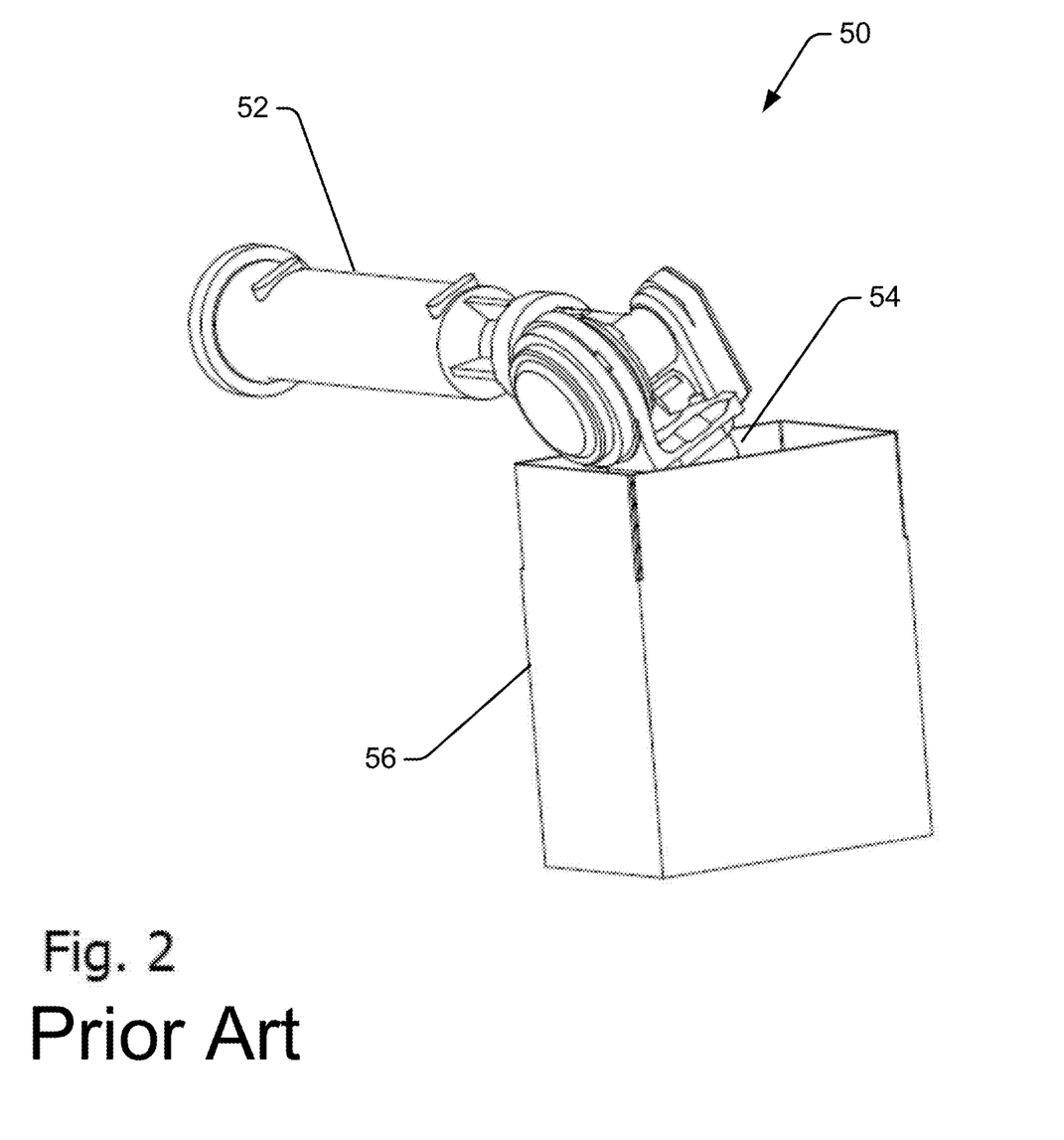
FIG. 2 is a further perspective view of the system of FIG. 1, wherein the end-of-arm tool and item of merchandise have been lowered into a case.

FIG. 2 shows the robotic arm 52 and the end-of-arm tool 54 as the system 50 lowers the item of merchandise into the case 56.

Figure 3:
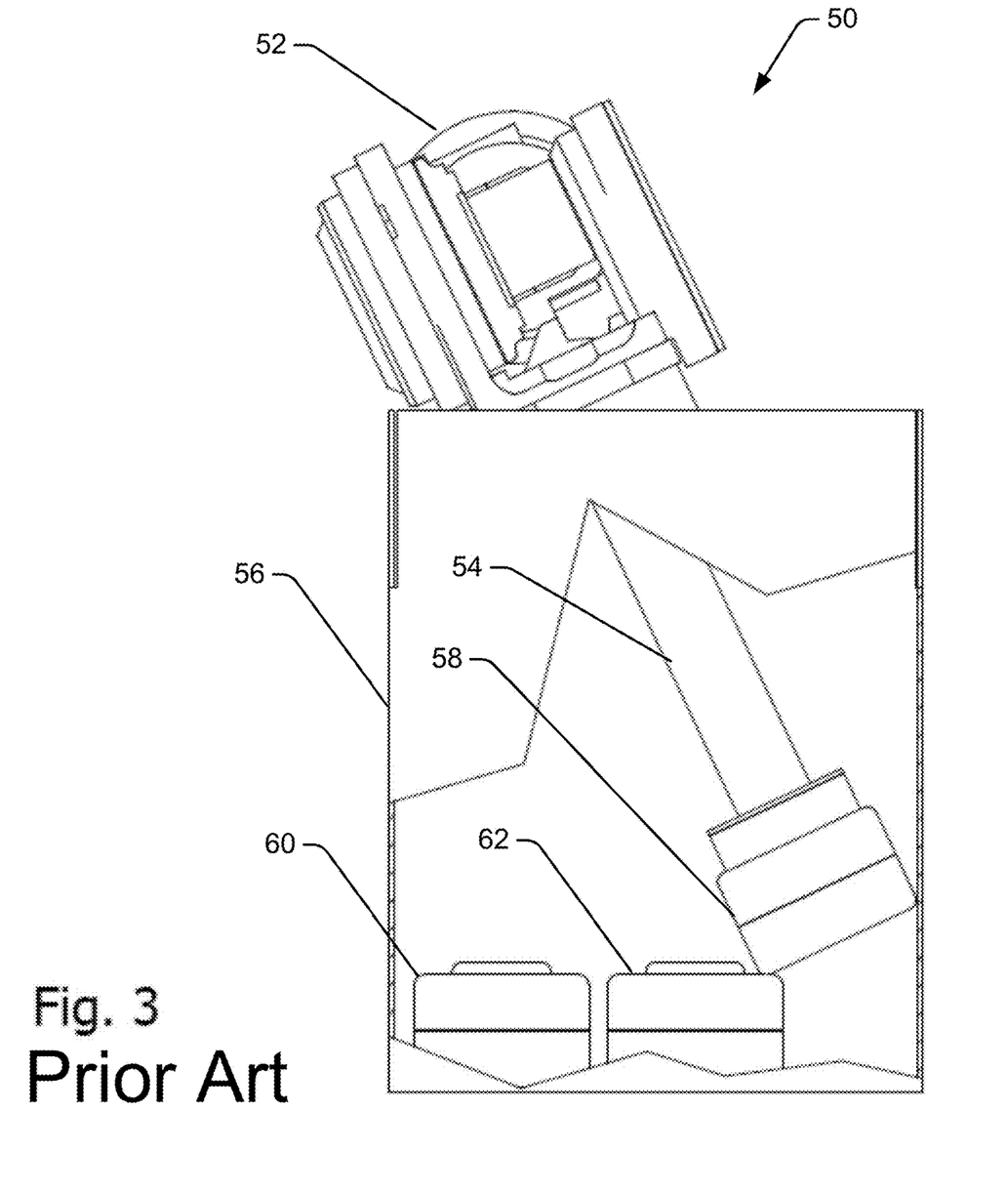
FIG. 3 is an orthographic view of the system of FIG. 1, wherein portions of the case have been removed to show that the first two items in a row of merchandise were incorrectly located, and showing that the end-of-arm tool is unable to place the third item of merchandise in a correct location, due to the incorrectly-located items.

In FIG. 3, portions of the case 56 have been removed to show that the first two items 60, 62 in a row of merchandise were incorrectly located (e.g., there is space between them). Accordingly, the end-of-arm tool 54 is unable to correctly place the third item 58 of merchandise, because the incorrectly-located items 60, 62 have taken up too much space. Thus, the system 50 is attempting to form a row of three items of merchandise in the bottom of the case 56, including an initially-loaded item 60, a penultimate item 62, and the final item 58. The initially-loaded item 60 and the penultimate item 62 have moved (perhaps slid, due to their construction of a slick material of a flexible shape) too far to the right, and the end-of-arm tool 54 does not have space to place the final item 58 in its correct and predetermined location. Referring to FIG. 3, the robotic arm has rotated as far as it can, and the item 58 has touched the wall of the case 56. However, despite the rotation, the system 50 is not able to be move the item 58 to the right of the penultimate item 62. Thus, the system 50 is unable to use item 58 to push item 62 into its intended position, and is also unable to position item 58 between item 62 and the side of the case 56. According, the system 50 fails to properly load the items into the case, and may load less than the appropriate number of items into each row and/or into the entire case 56.

Example System and Techniques

Figure 4:
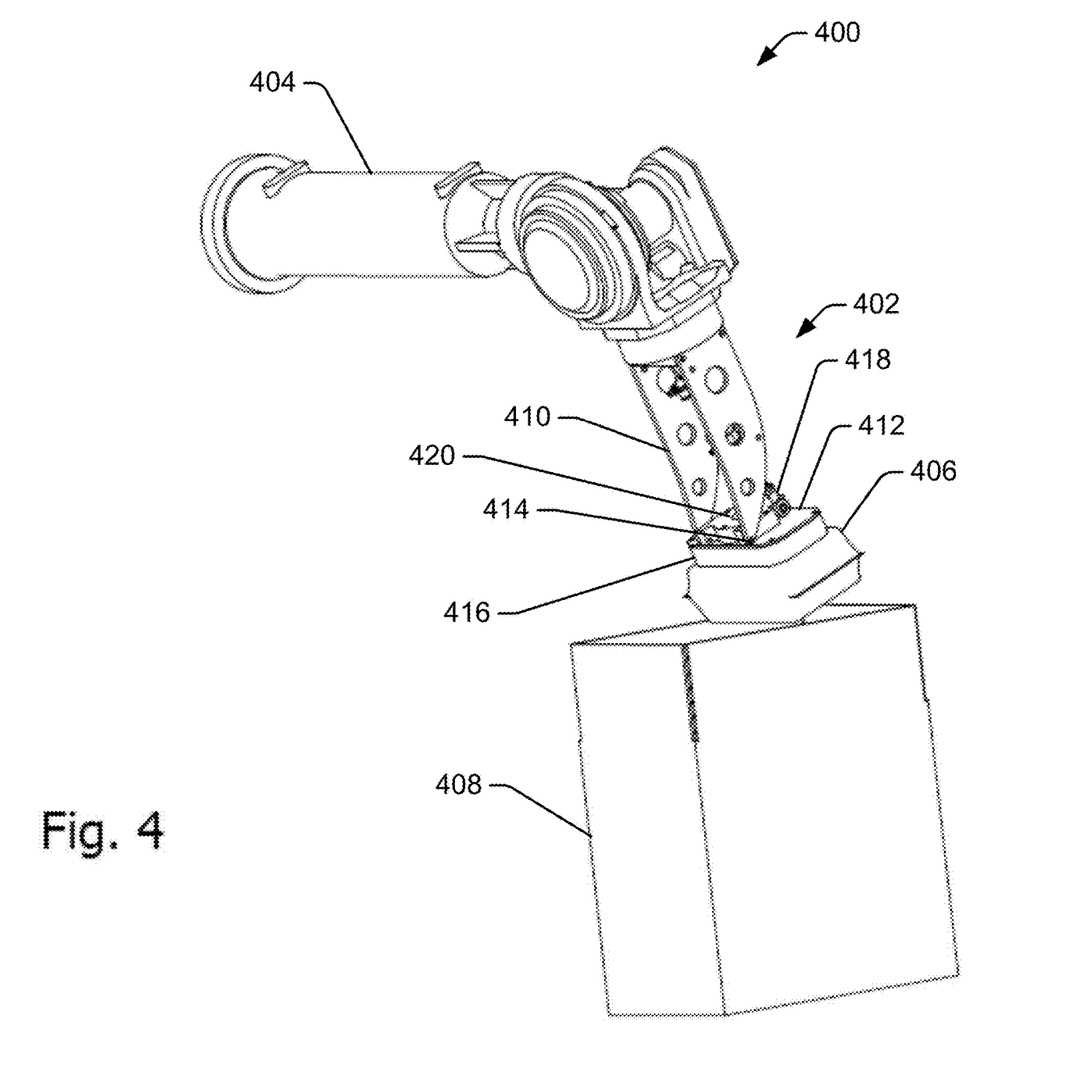
FIG. 4 is a perspective view of an example pivotable end-of-arm tool on a robotic arm, wherein the tool holds an item of merchandise and is moving to position the item within an open case.

FIG. 4 shows a system 400 including a pivotable end-of-arm tool 402 on a robotic arm 404. In the example formation shown, the end-of-arm tool 402 holds an item 406 of merchandise and is moving to position the item within an open case 408.

In the example of FIG. 4, the end-of-arm tool 402 has a frame 410. A base 412 may be connected to the frame by a hinge or pivoting fastener 414. The pivoting fastener 414 allows pivotable movement of the base 412 with respect to the frame 410. The base 412 may be moved with respect to the frame 410 by an actuator 418. The actuator 418 may be an air cylinder or other mechanical or electro-mechanical device. In an example, the cylinder of the actuator 418 may be driven in both directions by compressed air. Accordingly, the base 412, a fastener 416 and an item 406 held by the fastener may be pivoted in both the clockwise and the counter-clockwise directions, about the pivoting fastener 414. By pivoting the base 412 about the pivoting fastener 414, the item 406 may be held in a plurality of orientations, from vertical (wherein the top surface of the item is horizontal and faces upwardly) to an angled or tilting orientation (wherein the top of the item is not horizontal, i.e., wherein the top surface does not face upwardly).

In the example of FIG. 4, the base 412 may be attached to, or configured with, a fastener 416 to connect the end-of-arm tool 402 to a surface of the item 406. In an example, the fastener 416 is configured to temporarily attach to an item 406 to be put into the case 408. The fastener 416 may utilize a vacuum and/or suction cup technology, to grasp onto the top surface of the item 406, even when that surface is irregular in shape and/or flexible. A vacuum port 420 may be configured to provide suction, as needed, to the fastener. In an alternative to use of a vacuum and/or a suction cup, a mechanical gripper, scoop, or other tool may be used to pinch, grasp and/or hold an item. The technology used to grasp the item may be based at least in part on the nature of the items to be placed in the case.

Figure 5:
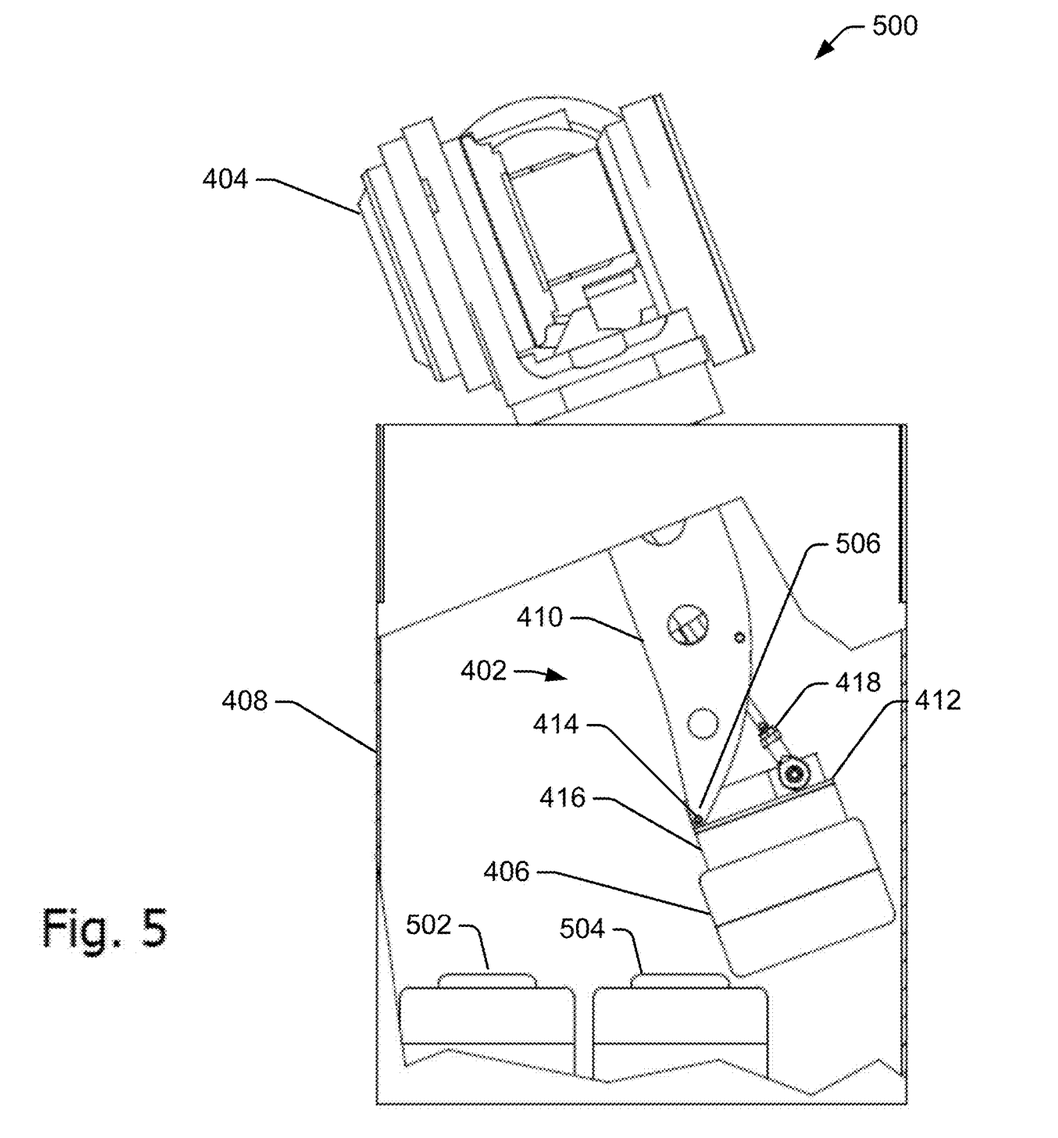
FIG. 5 is an orthographic view of the pivotable end-of-arm tool on the robotic arm holding the item of merchandise, wherein the item is to be put at the end of a row of previously-placed items, and showing in a cut-out of the case that the two previously-placed items were incorrectly located.

FIG. 5 shows a formation, configuration, organization and/or system-orientation 500, wherein the pivotable end-of-arm tool 402 on the robotic arm 404 has moved the item 406 of merchandise into a location within the case 408. The orientation of the item 406 may be controlled by movement of the base 412 and fastener 416, which rotate or pivot about the pivoting fastener 414 according to extension or retraction of the actuator 418. In an example, the pivoting fastener 414 may be attached to the frame at a pointed end portion 506 of the frame 410. The shape of the pointed end portion 506 is configured to allow rotation of the base 412 with respect to the frame 410 into the inclined orientation. Thus, the pointed end portion 506 allows the base 412 to pivot on the frame 410 between the position seen in FIG. 5 to the position seen in FIG. 6.

In the example shown, the item 406 will be placed at the end of a row of previously-placed items, including a first item 502 in a row of items of merchandise, and the penultimate (next to last) item 504 in that row of items. However, the first item 502 and the penultimate item 504 in the row are out-of-position, in that both have slid slightly to the right of their predetermined and intended locations. The left side of the first item 502 should have been touching the left side of the case 408 (in the orientation shown), and the penultimate item 504 should have been touching the first item 502 (i.e., it should be located to the left of its shown location).

Figure 6:
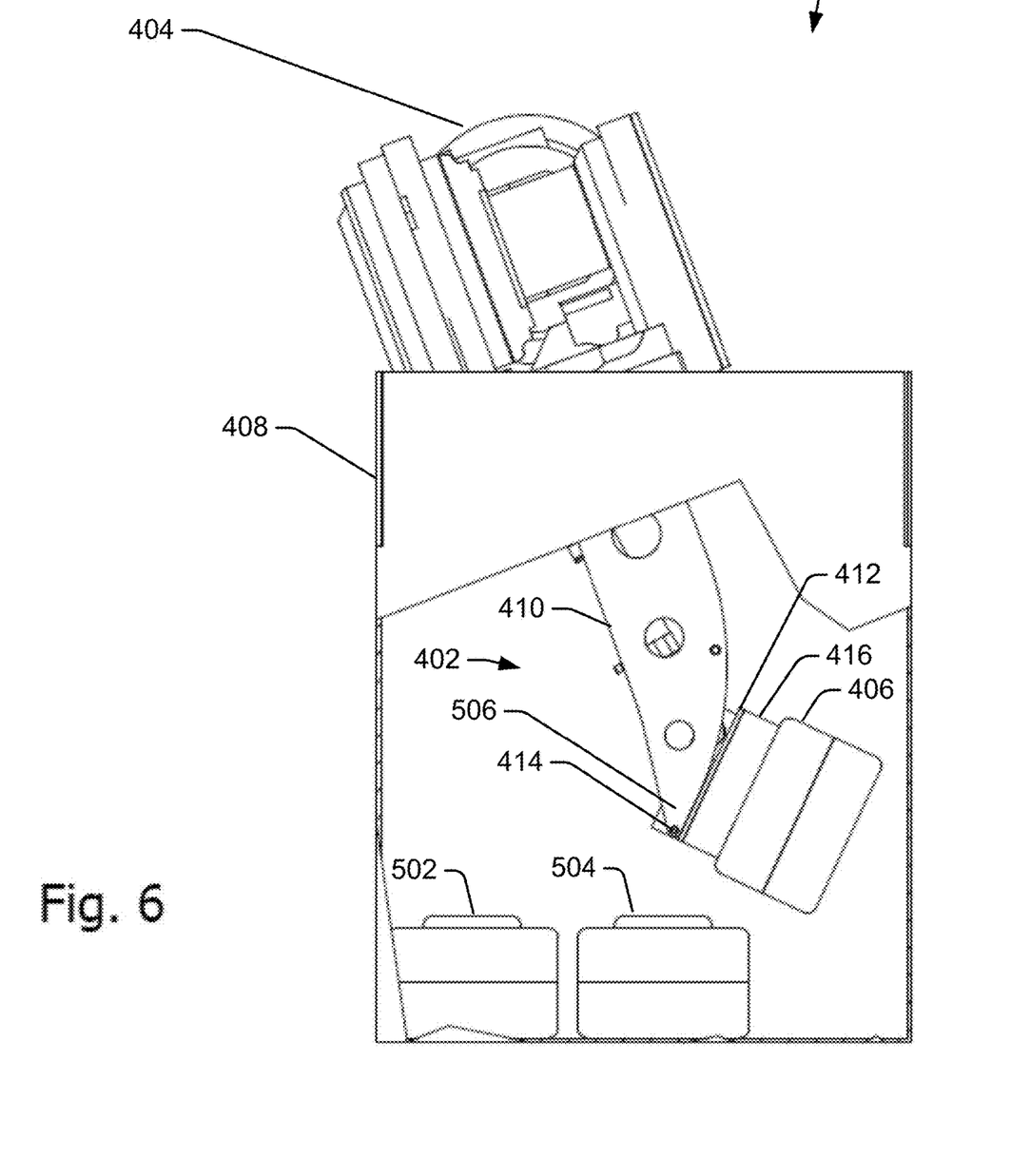
FIG. 6 is an orthographic view of the pivotable end-of-arm tool on the robotic arm pivoting to position wherein a side of the third item can be moved to contact and reposition the two previously incorrectly-located items.

FIG. 6 shows a formation 600, wherein the end-of-arm tool 402 on the robotic arm 404 has pivoted the item 406 in the counter-clockwise direction about the pivoting fastener 414. By pivoting the base 412, fastener 416, and item 406 attached to the fastener, counter-clockwise about the pivoting fastener 414, a side of the item 406 moves to a position from which it may be moved into contact with the penultimate item 504. In the example shown, the pivoting was powered by the actuator 418 (better seen in FIG. 5), which has retracted to pull the base counter-clockwise about the pivoting fastener 414.

Figure 7:
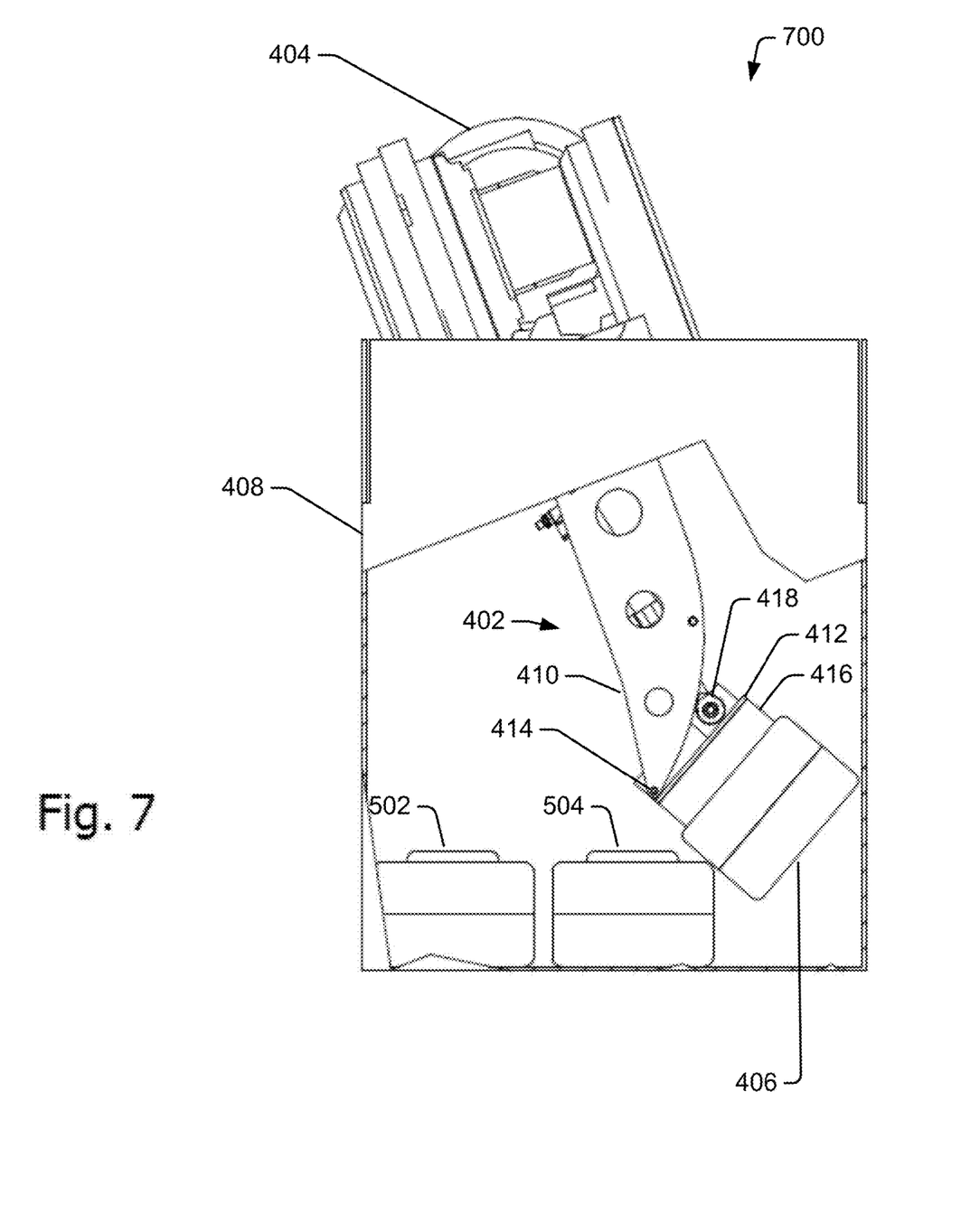
FIG. 7 is an orthographic view of the pivotable end-of-arm tool on the robotic arm having pivoted and moved to a position wherein the third item of merchandise is in contact with, and ready to push and reposition, at least one previously incorrectly-located items, to thereby make room for the third item, which is held by the tool.

FIG. 7 shows a formation 700, wherein the third item 406 of merchandise has been moved into contact with the penultimate item 504. In the example shown, the base 412 has pivoted clockwise about the pivoting fastener 414 (relative to its position in the formation 600 of FIG. 6) and the end-of-arm tool 402 has moved slightly, to better position the third item 406 to contact the penultimate item 504. Accordingly, in the sequence of view in FIGS. 6 through 8, the end-of-arm tool 402 may move (responsive to movement or the robotic arm) at the same time as the base 412 is pivoted with respect to the frame 410 of the tool 402. These two methods of moving the item 406 may be coordinated by software so that they combine to result in appropriate movement of the item 406.

Figure 8:
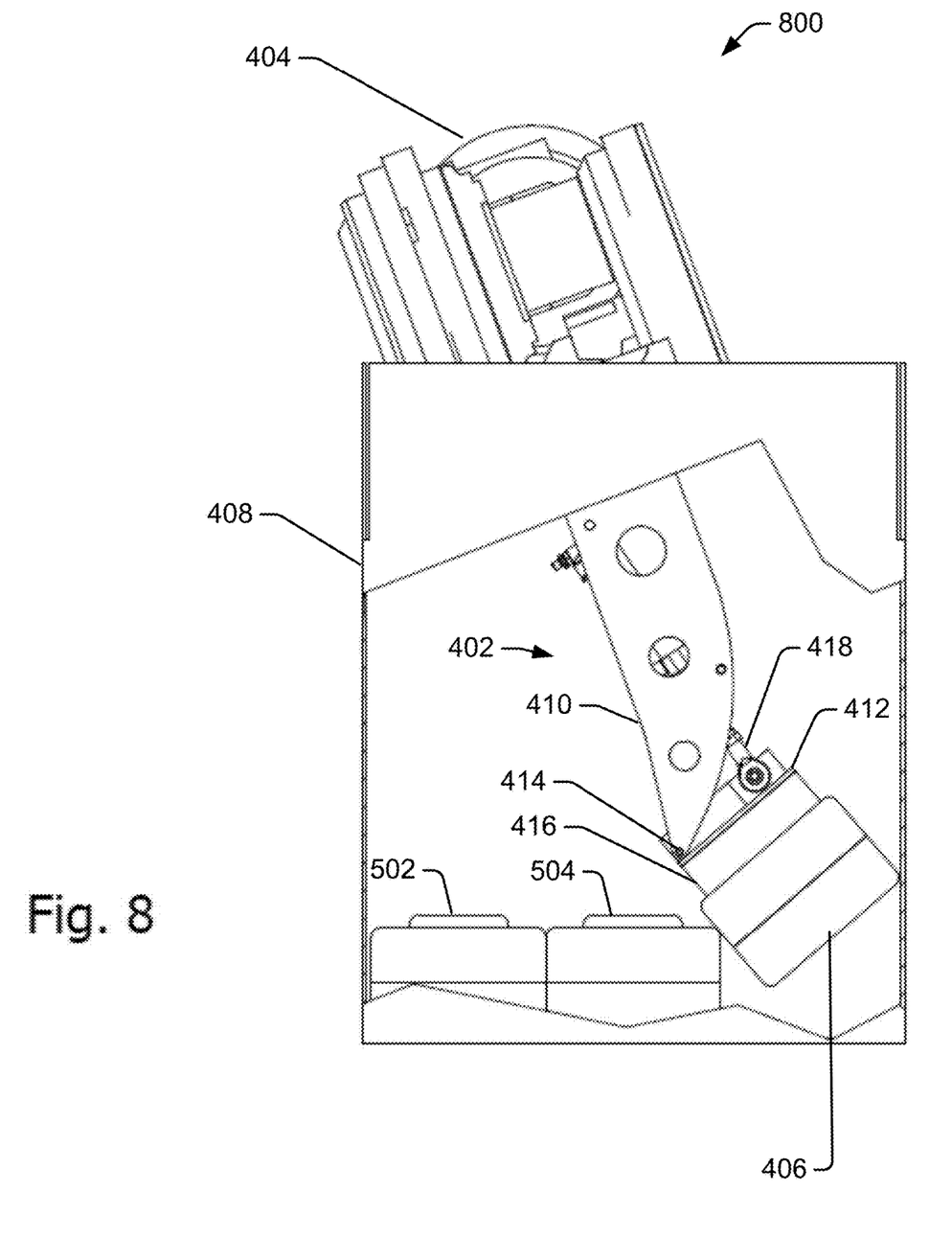
FIG. 8 is an orthographic view of the pivotable end-of-arm tool on the robotic arm, having repositioned the two previously incorrectly-located items, the tool is preparing pivot or rotate the item held by the tool into a vertical orientation appropriate to locate the item within a prescribed location within the case.

FIG. 8 shows a formation 800, wherein the end-of-arm tool 402 and robotic arm 404 have repositioned the two previously incorrectly-located items in the row of items, i.e., the first item 502 and the penultimate item 504 have been repositioned. In the view shown, the item 406 has pushed the first item 502 and the penultimate item 504 to the left. Repositioning of these items results in sufficient space for the item 406 to be located at the end of the row of items. In the example shown, the tool 402 pushed the first item 502 and the penultimate item 504 to the left by simultaneous movement of the end-of-arm tool both responsive and according to movement of the robotic arm 404, and by clockwise rotation of the base 412 about the pivoting fastener 414.

Figure 9:
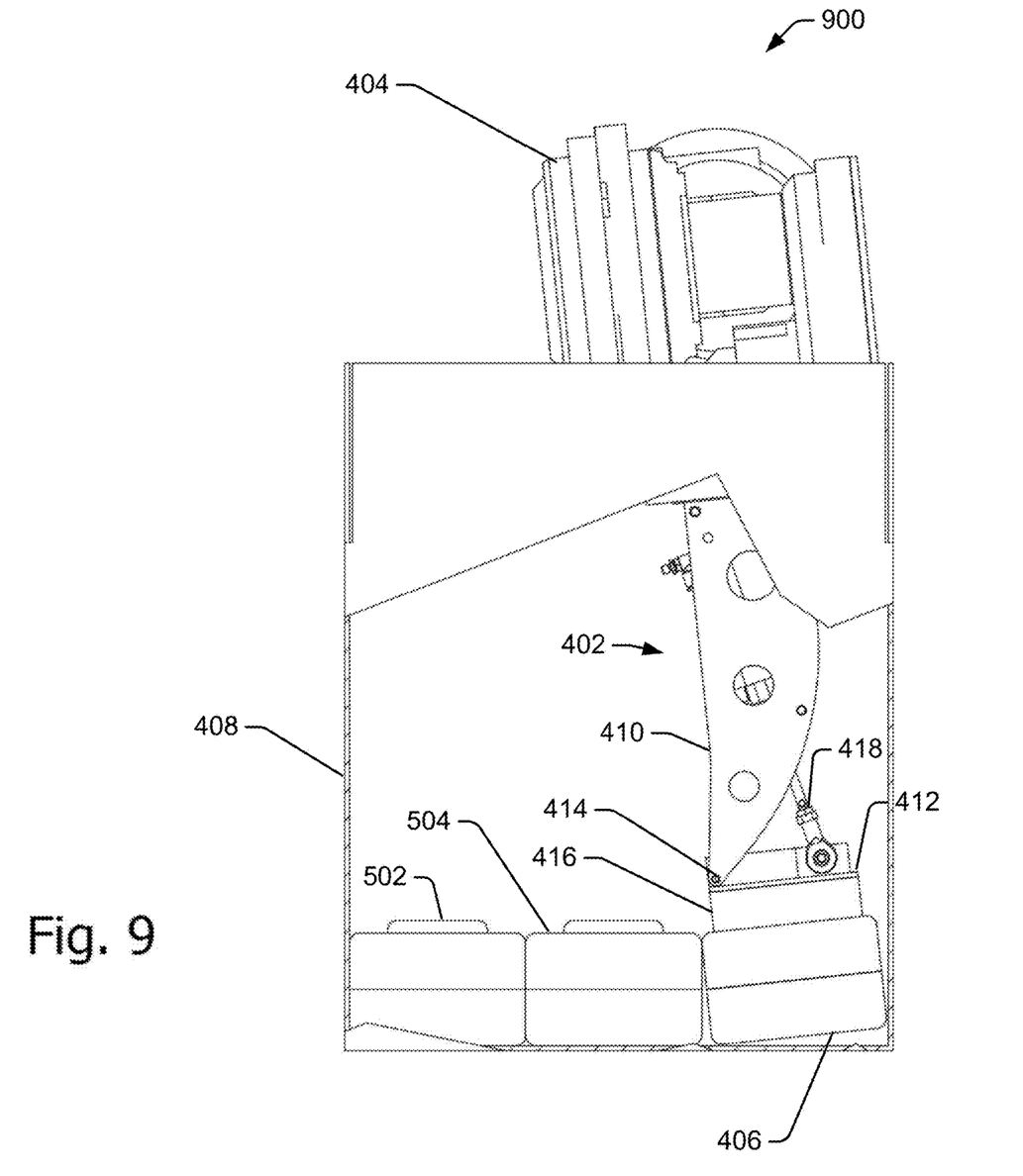
FIG. 9 is an orthographic view of the pivotable end-of-arm tool on the robotic arm, wherein the tool and arm have substantially completed the process of pivoting and moving the tool to orient and lower the third item into the prescribed position within the case.

FIG. 9 shows a formation 900, wherein the robotic arm 404 has moved the end-of-arm tool 402 to the right, and wherein the base 412 has continued to rotate clockwise about the pivoting fastener 414. In the view shown, the end-of-arm tool 402 has substantially completed the process of pivoting and moving the tool to orient and lower the third item 406 into a predetermined position within the case 408.

Figure 10:
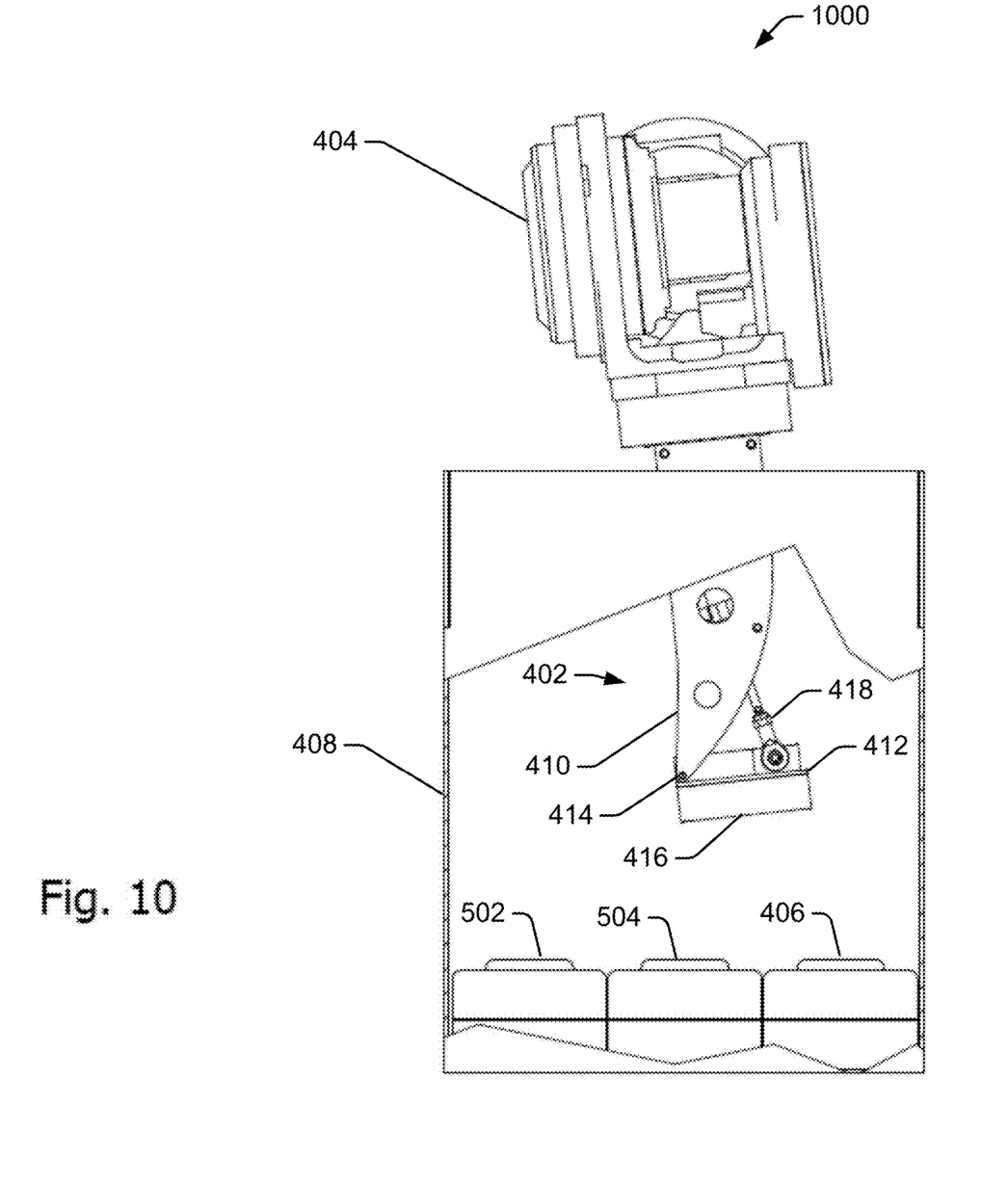
FIG. 10 is an orthographic view of the pivotable end-of-arm tool on the robotic arm, having released the third item of merchandise, and having begun to move from the case and into a position to grasp a further item of merchandise.

FIG. 10 shows a formation 1000, wherein the pivotable end-of-arm tool 402 on the robotic arm 404 has released the third item 406 of merchandise, and has begun to move out of the case 408, perhaps to grasp a further item of merchandise and to begin a further row of items on top of the existing row.

Example Methods

In some examples of the techniques discussed herein, the methods of operation may be performed by one or more application specific integrated circuits (ASIC), gate arrays, field programmable gate arrays or logic devices, ladder logic devices, or general-purpose processor(s) utilizing software defined in computer readable media. Any and/or all of such devices are shown generically as logic device 1102. In the examples and techniques discussed herein, the memory 1104 may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 11:
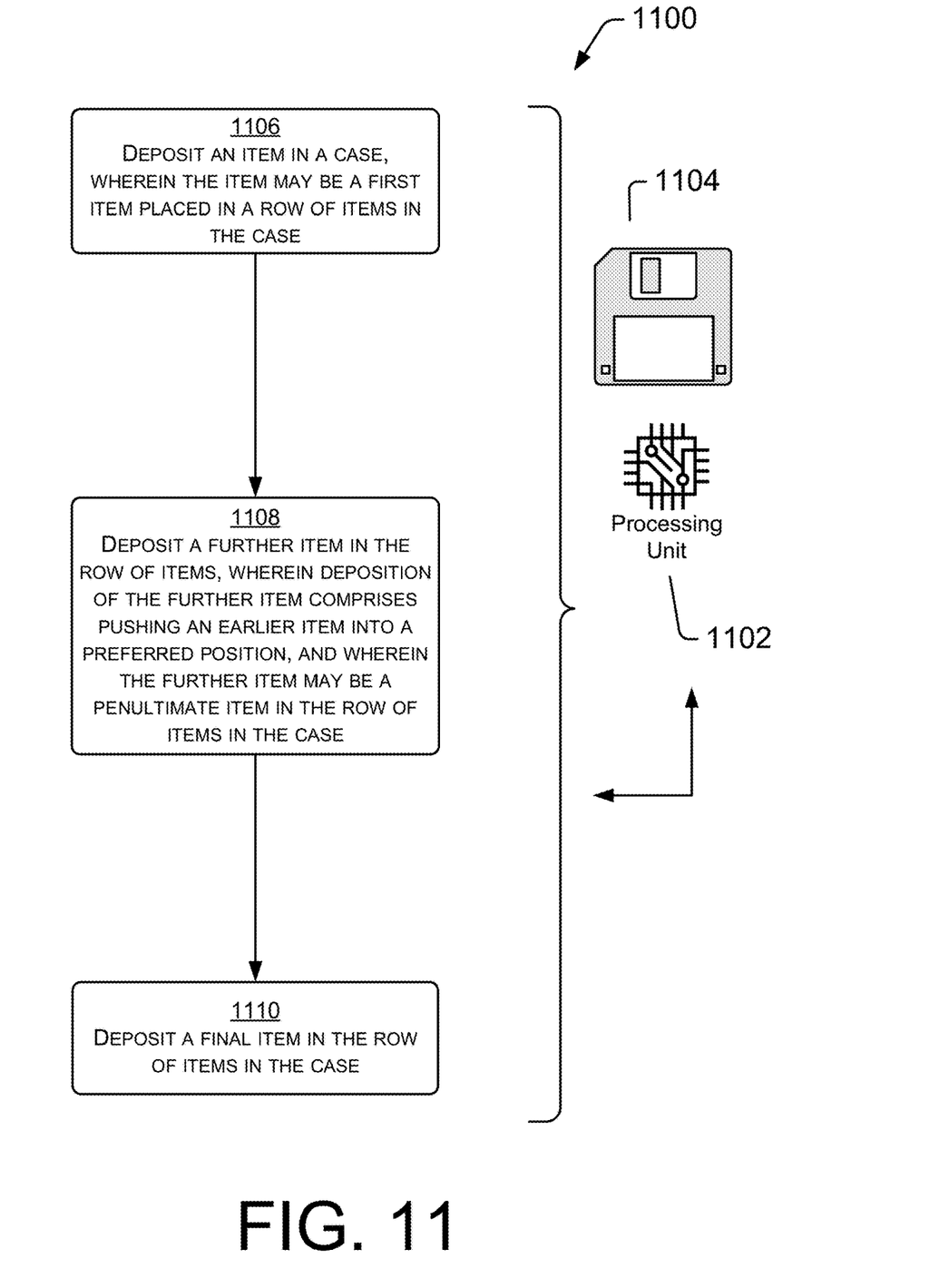
FIG. 11 is a flow diagram, describing example operation of the end-of-arm tool and robotic arm.
Figure 12:
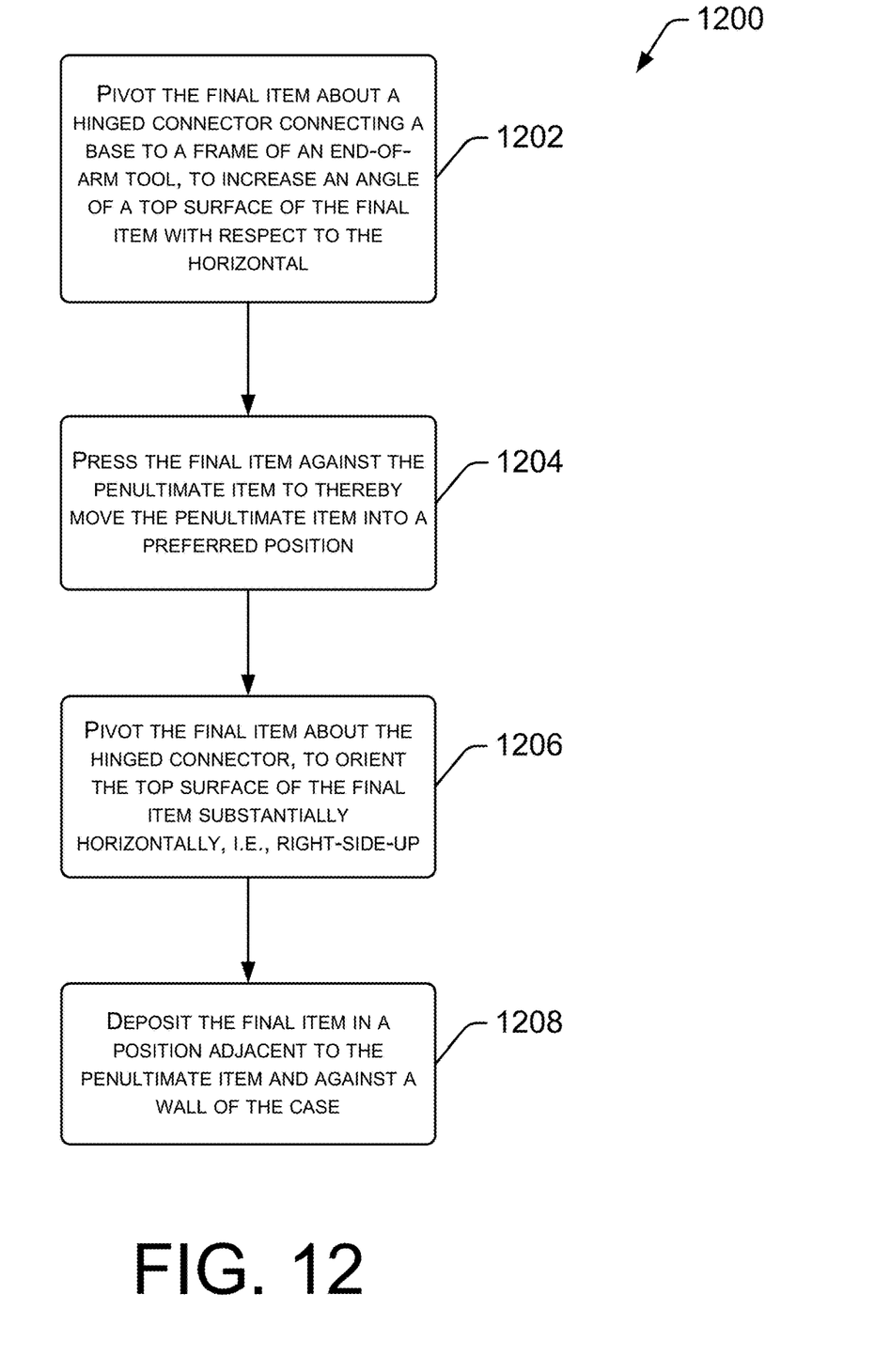
FIG. 12 is a flow diagram, describing example operation of the end-of-arm tool and robotic arm.

FIGS. 11 and 12 are flow diagrams showing an example processes which are representative of techniques for use in operation of a robotic arm and end-of-arm tool. The processes may, but need not necessarily, be implemented in whole or in part by the system 400 and related configurations, formations, etc., as shown and described in FIGS. 4 through 10.

FIG. 11 is a flow diagram 1100, describing example operation of the end-of-arm tool and robotic arm. At block 1106, an item of merchandise is deposited in a case. In an example, the item may be a first item placed in a row of items in the case. Referring to the example of FIG. 4, the item 406 is attached to the end-of-arm tool by the fastener (which may use a partial vacuum, etc.). As seen in FIG. 5, items 502, 504 have previously been deposited in the case 408. Item 406 is in the process of being deposited in the case.

At block 1108, a further item is deposited in the row of items. In the example, the further item pushes one or more earlier items into their respective preferred positions. In the example, the further item may be the penultimate item, and it may slip slightly, into an inappropriate location.

At block 1110, a final item is deposited into the row of items in the case. In an example, the end-of-arm tool pivots the final item into a position wherein a side surface of the final item may be used to push the penultimate item into its appropriate location. The end-of-arm tool then pivots to reorient the item to a vertical, right-side-up position, and the tool places the final item into its appropriate location.

FIG. 12 shows an example of how block 1110 of FIG. 11 is performed. At block 1202, the final item is pivoted about a pivoting fastener or hinged connector connecting a base to a frame of an end-of-arm tool, to increase an angle of a top surface of the final item with respect to the horizontal. In an example, FIG. 6 shows an item having been pivoted about the pivoting fastener.

At block 1204, the final item is pressed or pushed against the penultimate item to thereby move the penultimate item into a preferred position. FIGS. 7 and 8 show an example of how the final item is used to push the penultimate item into its preferred, appropriate and/or intended position.

At block 1206, the final item is pivoted, (e.g., by operation of a pivoting fastener of an end-of-arm tool), to orient the top surface of the final item substantially horizontally (i.e., a right-side-up orientation). FIG. 9 shows an example of the item pivoted into a right-side-up orientation.

At block 1208, the final item is placed or deposited into a position adjacent to the penultimate item and against a wall of the case. FIG. 10 shows an example of the final item placed in the appropriate position.

Figure 13:
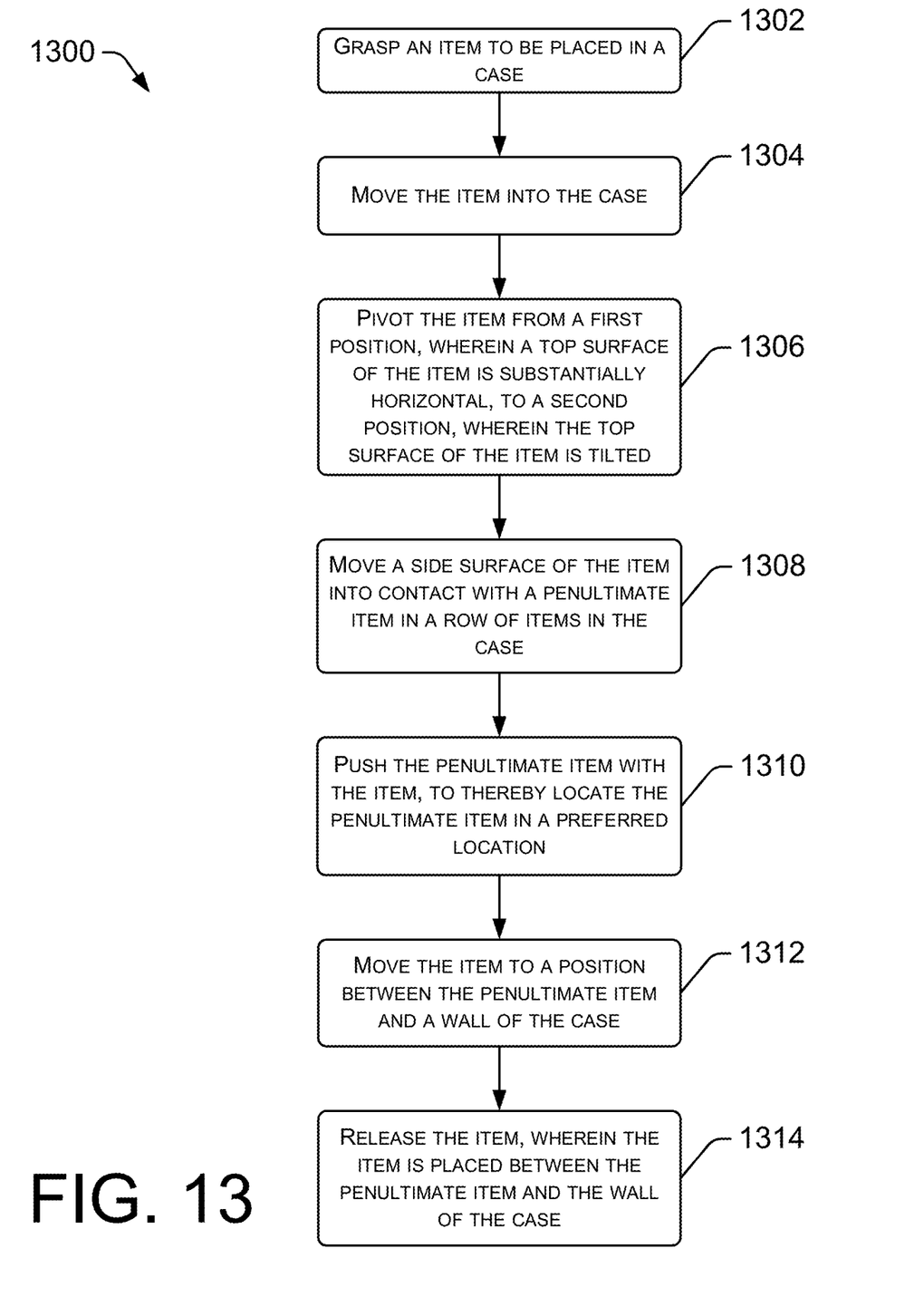
FIG. 13 is a flow diagram, describing example operation of the end-of-arm tool and robotic arm.

FIG. 13 is a flow diagram 1300, describing example operation of a robotic arm and an associated end-of-arm tool. In the example, the end-of-arm tool places items into a case. In the example, the end-of-arm tool is configured to grasp a surface of an item of merchandise and deposit the item into the case. As an item is deposited, the tool may use contact with that item to move previously placed item(s) into respective preferred location(s). After the penultimate item (in some examples, the next-to-last item is also the first item) in a row of items is put in place, it may move out of position. As a final item is added to a row, the tool may pivot and/or move the final item so that a surface (e.g., side surface) of the final item pushes the penultimate item into its correct position. The pushing action may be based at least in part on movement of the robotic arm and/or rotation of a base holding the final item. The tool then pivots the final item to orient the top surface of the final item horizontally, and places the final item in a predetermined position.

At block 1302, an item to be placed in a case may be grasped by an end-of-arm tool, e.g., as seen in FIG. 4. FIG. 4 shows the item 406 may be grasped by a base 412 having a fastener 416. The fastener 416 may be of any design indicated by the type of item, and may include grasping tools, a partial vacuum suction cup(s), hooks, magnets, etc.

At block 1304, the item may be moved into the case, e.g., as seen in FIG. 5. FIG. 5 shows that movement of the item 406 may result from movement of the end-of-arm tool and robotic arm. Thus, the robotic arm is programmed for appropriate movement, based in part on size of the items, numbers of previously placed items, etc.

At block 1306, the item may be pivoted from a first position, wherein a top surface of the item is substantially horizontal, to a second position, wherein the top surface of the item is tilted, e.g., as seen in FIG. 6. FIG. 6 shows the item 406 being pivoted about the pivoting fastener 414, responsive to movement of the actuator 418 (seen in FIG. 5). The pointed end portion 506 of the frame 410 allows the item 406 to pivot without unwanted contact without the frame. The pivoting and/or rotation of the item is seen by comparison of FIGS. 5 and 6.

At block 1308, a side surface of the item may be moved into contact with a penultimate item in a row of items in the case, e.g., as seen in FIG. 7. FIG. 7 shows that the side surface of the item is moved into contact with the next-to-last item in the row.

At block 1310, penultimate item may be pushed with the item held by the end-of-arm tool, to thereby locate the penultimate item in a preferred location, e.g., as seen in FIG. 8. FIG. 8 shows that rotation of the item 406 about the pivoting fastener 414 (which may be powered by the actuator 418) has pushed the penultimate item into previous items (e.g., the first item), thereby correctly positioning the earlier items and providing space for the last item.

At block 1312, item may be moved to a position between the penultimate item and a wall of the case, e.g., as seen in FIG. 9. FIG. 9 shows the final item moving into a position within the case that was cleared at least in part by action of the final item, pushing other items into their appropriate location. Note that each item, when positioned in the case, may similarly push any/all previously loaded item(s) into their preferred positions. This reduces any tendency for items to become increasingly disarrayed as they are added to the case. This is generally possible for each item in a row of items, except the first item loaded into the case or in to a row in the case.

At block 1314, item may be released by the end-of-arm tool, wherein the item is placed and/or located between the penultimate item and the wall of the case, e.g., as seen in FIG. 10. FIG. 10 shows the item 406 correctly positioned, after having pushed items 502, 504 into their correct positions. The fastener 416 has released the item 406, such as by releasing a partial vacuum at a suction cup. The end-of-arm tool 402 is moving out of the case, possibly to grasp and additional item to load into the case on a second level of items.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An end-of-arm tool for a robotic arm, the end-of-arm tool comprising:
a frame of the end-of-arm tool connected to the robotic arm;
a base having a fastener to connect to a surface of an item;
a pivoting fastener to connect the frame to the base;
an actuator connected to the base and to the frame, and configured to orient the base to desired orientations between an inclined orientation and a substantially horizontal orientation; and
one or more computer-readable media storing computer-executable instructions that, when executed, cause one or more processors to perform acts comprising:
grasping a top side of the item to be placed in a location within a case that is between a penultimate item and a wall of the case;
pivoting the item from a first position, wherein the top side of the item is substantially horizontal, to a second position, wherein the top side of the item is tilted;
moving a first side of the item into contact with the penultimate item in a row of items in the case;
pushing the penultimate item with the first side of the item, to thereby remove portions of the penultimate item from the location within the case;
moving the item to the location within the case that is between the penultimate item and the wall of the case; and
releasing the top side of the item, wherein the top side of the item is adjacent to the first side of the item, which is in contact with the penultimate item, and is adjacent to a second side, opposite the first side, that is in contact with the wall of the case.

2. The end-of-arm tool as recited in claim 1, wherein the substantially horizontal orientation positions the item for placement into a predetermined location within the case.

3. The end-of-arm tool as recited in claim 1, wherein the inclined orientation positions the first side of the item the penultimate item.

4. The end-of-arm tool as recited in claim 1, wherein the fastener is configured to receive a partial vacuum, to connect the end-of-arm tool to the item in a releasable manner.

5. The end-of-arm tool as recited in claim 1, wherein the frame comprises:
a pointed end portion configured to allow rotation of the base with respect to the frame into the inclined orientation.

6. One or more computer-readable media storing computer-executable instructions that, when executed, cause one or more processors to perform acts comprising:
depositing a penultimate item in a row of items in a case, wherein deposition of the penultimate item comprises pushing at least one previously placed item into a respective preferred position; and
depositing a final item in the row of items in the case, wherein deposition of the final item in the row of items comprises:
pivoting the final item about a pivoting connector connecting a base to a frame, to orient a top surface of the final item at an angle from the horizontal;
pressing the final item against the penultimate item to thereby move the penultimate item into a preferred position, wherein the moving is responsive to at least one of: movement of an end-of-arm tool, and pivoting of a fastener holding the final item to the end-of-arm tool;
pivoting the final item about the pivoting connector connecting the base to the frame, to orient the top surface of the final item substantially horizontally; and
depositing the final item in a position adjacent to the penultimate item.

7. The one or more computer-readable media as recited in claim 6, wherein depositing the final item in the position adjacent to the penultimate item comprises:
releasing suction on the fastener connected to the top surface of the final item, wherein the releasing is performed when the final item is in the position adjacent to the penultimate item.

8. The one or more computer-readable media as recited in claim 6, additionally comprising:
   pushing an item placed before the penultimate item with the penultimate item, to thereby locate the item placed before the penultimate item in a preferred location.

9. A method, comprising:
   under control of one or more processors configured with executable instructions:
   grasping a top side of an item to be placed in a location within a case that is between a penultimate item and a wall of the case;
   pivoting the item from a first position, wherein the top side of the item is substantially horizontal, to a second position, wherein the top side of the item is tilted;
   moving a first side of the item into contact with the penultimate item in a row of items in the case;
   pushing the penultimate item with the first side of the item, to thereby remove portions of the penultimate item from the location within the case;
   moving the item to the location within the case that is between the penultimate item and the wall of the case; and
   releasing the top side of the item, wherein the item is placed between the penultimate item and the wall of the case.

10. The method of claim 9, wherein grasping the item to be placed in the case comprises:
   grasping the item with an end-of-arm tool.

11. The method of claim 9, wherein moving the item into the case comprises:
   moving the item, attached to an end-of-arm tool, by operation of a robotic arm.

12. The method of claim 9, wherein pivoting the item from the first position to the second position comprises:
   pivoting the item by operation of a pivoting fastener on an end-of-arm tool.

13. The method of claim 9, wherein moving the first side of the item into contact with the penultimate item comprises one or more of:
   pivoting the item by operation of a pivoting fastener on an end-of-arm tool; and
   moving the item by operation of a robotic arm.

14. The method of claim 9, wherein pushing the penultimate item with the item, to thereby locate the penultimate item in the location comprises one or more of:
   pivoting the item by operation of a pivoting fastener on an end-of-arm tool; and
   moving the item by operation of a robotic arm.

15. The method of claim 9, wherein moving the item to the location between the penultimate item and the wall of the case comprises one or more of:
   pivoting the item by operation of a pivoting fastener on an end-of-arm tool; and
   moving the item by operation of a robotic arm.

16. The method of claim 9, wherein releasing the item comprises one or more of:
   releasing suction applied to a connector, of an end-of-arm tool, holding the item.

17. The method of claim 9, wherein moving the first side of the item into contact with the penultimate item, pushing the penultimate item with the item, and moving the item to the location between the penultimate item and the wall of the case, are performed by actions comprising:
   pivoting the item from the second position to the first position; and
   moving the item about a pivoting fastener to position the item next to the wall of the case.

18. The method of claim 9, additionally comprising:
   pushing an item placed before the penultimate item with the penultimate item, to thereby locate the item placed before the penultimate item in a preferred location.

* * * * *